United States Patent [19]

Gutjahr

[11] Patent Number: 5,016,184

[45] Date of Patent: May 14, 1991

[54] METHOD AND DEVICE FOR DIRECTING AND CONTROLLING THE OPERATION OF AN INJECTION MOLDING MACHINE

[75] Inventor: Lothar Gutjahr, Malterdingen, Fed. Rep. of Germany

[73] Assignee: Klockner Ferromatik Desma GmbH, Malterdingen, Fed. Rep. of Germany

[21] Appl. No.: 295,779

[22] Filed: Jan. 11, 1989

[30] Foreign Application Priority Data

Jan. 27, 1988 [DE] Fed. Rep. of Germany ....... 3802254

[51] Int. Cl.[5] ...................... G06F 15/46; B29C 45/76
[52] U.S. Cl. ................................... 364/476; 264/40.1; 364/138; 425/135
[58] Field of Search ............... 364/476, 473, 138, 139, 364/131–136; 425/136, 140, 149, 135, 145, 146, 150, 162, 163; 264/40.5, 40.7, 40.1; 340/825.06, 825.07, 825.14, 825.22

[56] References Cited

U.S. PATENT DOCUMENTS

| | | | |
|---|---|---|---|
| 4,674,053 | 6/1987 | Bannoi et al. | 364/476 |
| 4,846,664 | 7/1989 | Hehl | 264/40.5 |
| 4,847,779 | 7/1989 | Masao et al. | 364/476 |
| 4,851,170 | 7/1989 | Shimizu et al. | 425/135 |

FOREIGN PATENT DOCUMENTS 34448047 12/1984 Fed. Rep. of Germany .
3701554 1/1987 Fed. Rep. of Germany .

OTHER PUBLICATIONS

Stiehl, W. E.: Data Exchange in Measuring Systems: Technisches Massen tm, vol. 53; pp. 128–132 (4/1986).
Kahn, Robert E.; Networks for Modern Computers; Spektrum der Wissenschaft; pp. 108–116; (Dec. 1987).
Gelernter, David; Programming the Most Modern Computers; Spektrum der Wissenschaft, pp. 74–82; (Dec. 1987).
Goals and Applications of Field Bus Systems, T. Pfeifer et al., Automatisierungstechnische Praxis atp, vol. 29, issue 12/1987, pp. 549–557.
Bus System for Vehicle Control Devices, W. Botzenhardt et al., VDI Reports No. 612, 1986, pp. 459–470.

*Primary Examiner*—Joseph Ruggiero
*Attorney, Agent, or Firm*—Watson, Cole, Grindle and Watson

[57] ABSTRACT

A method and device for directing and controlling the operation of an injection molding machine having sensors which provide actual values during machine operation, the machine having actuators forming and executing control orders received from the sensors. The sensors and actuators are serially connected via a closed loop control cable such that all information is available in successive words. The sensors and/or actuators deliver their information jointly and in dependence on the status of the program. The actuators jointly execute their control orders in corresponding numbers. The actuators and sensors are coupled through interface couplers to the closed loop or stub cable.

8 Claims, 4 Drawing Sheets

METHOD AND DEVICE FOR DIRECTING AND CONTROLLING THE OPERATION OF AN INJECTION MOLDING MACHINE

BACKGROUND OF THE INVENTION

This invention relates to a method for directing and controlling the operation of an injection molding machine having sensors which provide actual values during machine operation, the machine having actuators forming and executing control commands received from the sensors.

Generally the directing and controlling of an injection molding machine is carried out in such a manner that from a central position all data from the sensors are processed according to a program, the control commands and controller output being established and passed on to the servo components. This, however, requires a considerable investment in hardware and software.

In other areas of technology, such as in telecommunications, it is known to execute control commands according to the multiplex process.

In data processing it is also known to transmit data according to the multiplex process.

Moreover, a publication entitled "Goals and Applications of Field Bus Systems", T. Pfeifer, et al., Vol. 29, Issue 12/1987, pp. 549–557, discloses the serial transmission of data by means of the so-called "field bus" systems.

It is also known to provide such field bus systems for motor vehicle control devices, as set forth in a publication entitled, "Bus System for Vehicle Control Devices", W. Botzenhardt, et al., VDI Report No. 612, 1986, pp. 459–470.

For injection molding machines the direction and control requires a profusion of data to be processed which, with serial processing, often involves insurmountable time problems.

For this reason it is generally not possible to utilize the known serial transmission systems The processing of the data on parallel line systems, however, is uneconomical because of the software and hardware expenses.

SUMMARY OF THE INVENTION

It is therefore an object of the present invention to provide a method for directing and controlling the operation of an injection molding machine having sensors which provide actual values during machine operation, the machine having actuators forming and executing control commands received from the sensors, as well as a device for carrying out this process. The invention has the advantages of the serial and parallel processing of the data, but not their disadvantages.

In accordance with the invention, the sensors and actuators are serially connected via a closed loop circuit or control cable such that all information is available in successive words, the actuators and/or sensors releasing their information jointly and in dependence on the status of the program, the corresponding number of actuators jointly executing their control commands.

DETAILED DESCRIPTION OF THE INVENTION

Figure 1:
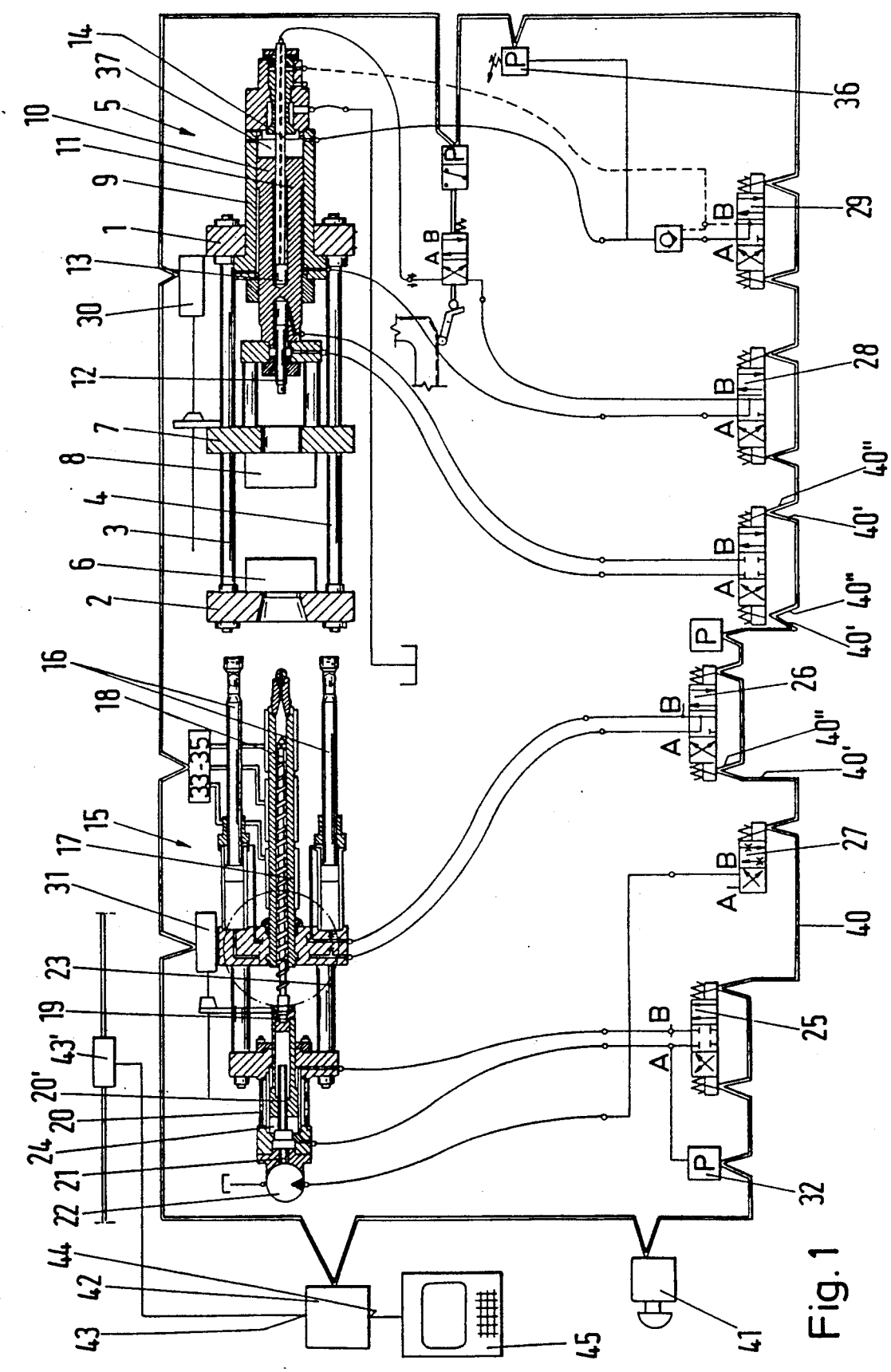
FIG. 1 is a sectional/schematic view of an injection molding machine with direction and control carried out according to the invention.

FIG. 1 illustrates a top, sectional view of an injection molding machine which includes a mold closing unit 1-14 generally of the type set forth in either of U.S. Pat. Nos. 4,592,713, 4,592,714, 4,599,063 or 4,605,367, commonly owned herewith. The injection molding machine further includes a plastification and injection unit, generally designated 15, which is similar to that disclosed in U.S. Pat. No. 4,592,712, commonly owned herewith.

The injection molding machine includes a support bed (not shown) on which a pair of spaced, parallel support plates 1 and 2 are fixedly mounted and are interconnected by a plurality of guide rods 3 and 4 lying parallel to the central axis of the plates. Support plate 2 defines a stationary mold clamping plate on which one-half 6 of a divided injection mold is clamped, while the other half 8 of the mold is clamped on a movable mold clamping plate 7 mounted for sliding movement along the guide rods. In the intermediate position, the two halves of the mold define a mold cavity or nest in a known manner into which plastic material is injected through a sprue hole located in plate 2 by a plastification-injection unit, generally designated 15. A mold locking unit, generally designated 5, extends outwardly from one side of the movable mold clamping plate.

The mold locking unit comprises a mold closure retention cylinder 9 affixed at one end to support plate 1. A piston 10, operable within cylinder 9, has first and second pressure chambers 11 and 11a on opposite sides by means of which the piston is respectively retracted and extended relative to cylinder 9. The piston rod of the piston is connected to the movable mold clamping plate. The piston rod has an ejector 12 at its free end, and the piston is hollow so as to define a third pressure chamber 13 into which a hollow tube 14 extends in a telescoping manner. Tube 14 is rigidly secured to a front plate 14a of cylinder 9 and has a connection for a pressure line connected to a 4/2-way valve through which a hydraulic operating medium can be supplied and discharged. Piston 10, its piston rod and tube 14 define a traveling cylinder in which a chamber 13, when pressurized, effects extension of the piston outwardly of cylinder 9, and chamber 11, when pressurized, effects retraction of the piston inwardly of its cylinder. Pressure chamber 11 is connected to a supply line which leads to a 4/3 directional valve actuator 28.

The plastification-injection unit 15 is mounted on the machine bed (not shown) for longitudinal movement toward and away from plate 2 of the injection molding machine. For this purpose, hydraulic pistons 16, which operate in respective cylinders, are mounted at their free ends on the machine bed, such that their hydraulic cylinders, fixed to unit 15, are hydraulically operated to longitudinally shift unit 15 in the conventional manner.

The plastification-injection unit comprises an elongated screw housing 17, and an injection screw 18 mounted within this housing. An inlet funnel, shown in phantom outline at 23, is Provided on the housing through which granules of plastic material are fed as in any known manner. And, the housing has an outlet nozzle through which the material, when plasticized, is injected into the space between mating molds of the injection molding machine. The tip end of the screw, in a retracted position, is spaced from the outlet nozzle of the housing so as to define a plasticizing chamber.

The screw is rotated about its central axis in a direction which causes the granules of plastic material to be plasticized and fed into the plasticizing chamber. Rotation is effected by means of a hydromotor 22 which rotates a gear train (not shown) operatively coupled with the screw. And, the plastification-injection screw is connected, through a driven gear of the drive train, to a hydraulically operable piston 20 which operates within an injection cylinder 20a extending from the rearward end of the screw housing. The piston head of the injection piston defines, together with the cylinder, opposing pressure chambers 24 and 24a respectively interconnected through pressure lines with a source of hydraulic working fluid. A 4/3 directional valve actuator 25 is provided for pressurizing and venting chambers 24 and 24a when the valve is operated for axially shifting the injection screw.

At the end of the dynamic pressure phase after the termination of the plastification, a 4/3 directional valve actuator 26 is switched to its respective working position, so that unit 15 is axially shifted toward the injection molding machine and plastification cylinder 17 rests against the sprue hole of fixed mold clamping plate 2.

A 4/3 directional valve actuator 27 is hydraulically connected through a suitable pressure line to hydromotor 22. By switching valve actuator 28 to its respective working position and switching valve actuator 28' into the other set position, mold locking unit 5 is axially shifted to close. And, by switching a 4/3 directional valve actuator 29 into its respective set position, a mold-locking force is applied for carrying out the molding operation.

After cooling, the injection-molded part is ejected in the normal manner and further material is plasticized, fed to the mold parts of the molding machine for producing another injected-molded part.

Generally, one inflow line for the directional valves is connected to a supply of pressurized hydraulic fluid, and the other inflow line for the directional valves is connected with a tank, not shown in detail in the drawings.

For locking and opening the mold a position sensor 30 is operatively coupled in a known manner to the movable mold clamping plate 7.

Another position sensor 31 is coupled to the plastification-injection unit 15.

A pressure sensor 32 is arranged in the hydraulic lead to pressure chamber 34.

The plastification cylinder 17 has three temperature sensors 33-35 associated with three heating bands (not shown) with respective switches or actuators.

Another pressure sensor 36 registers the hydraulic pressure in the lead to pressure chamber 11a.

The electrical contacts of the actuators and sensors are interconnected via a closed loop lead 40, the connections of the actuators and sensors to this lead being represented by two legs 40' and 40" of the individual connections of the sensors and actuators (participants).

Also arranged in the closed loop lead is an emergency switch 41. A controller 42 is switched into the closed loop lead.

A connector 43 is provided on controller 42 for a LAN (Local Area Network), and a connector 44 on controller 42 is provided for an operating terminal 45.

Figure 2:
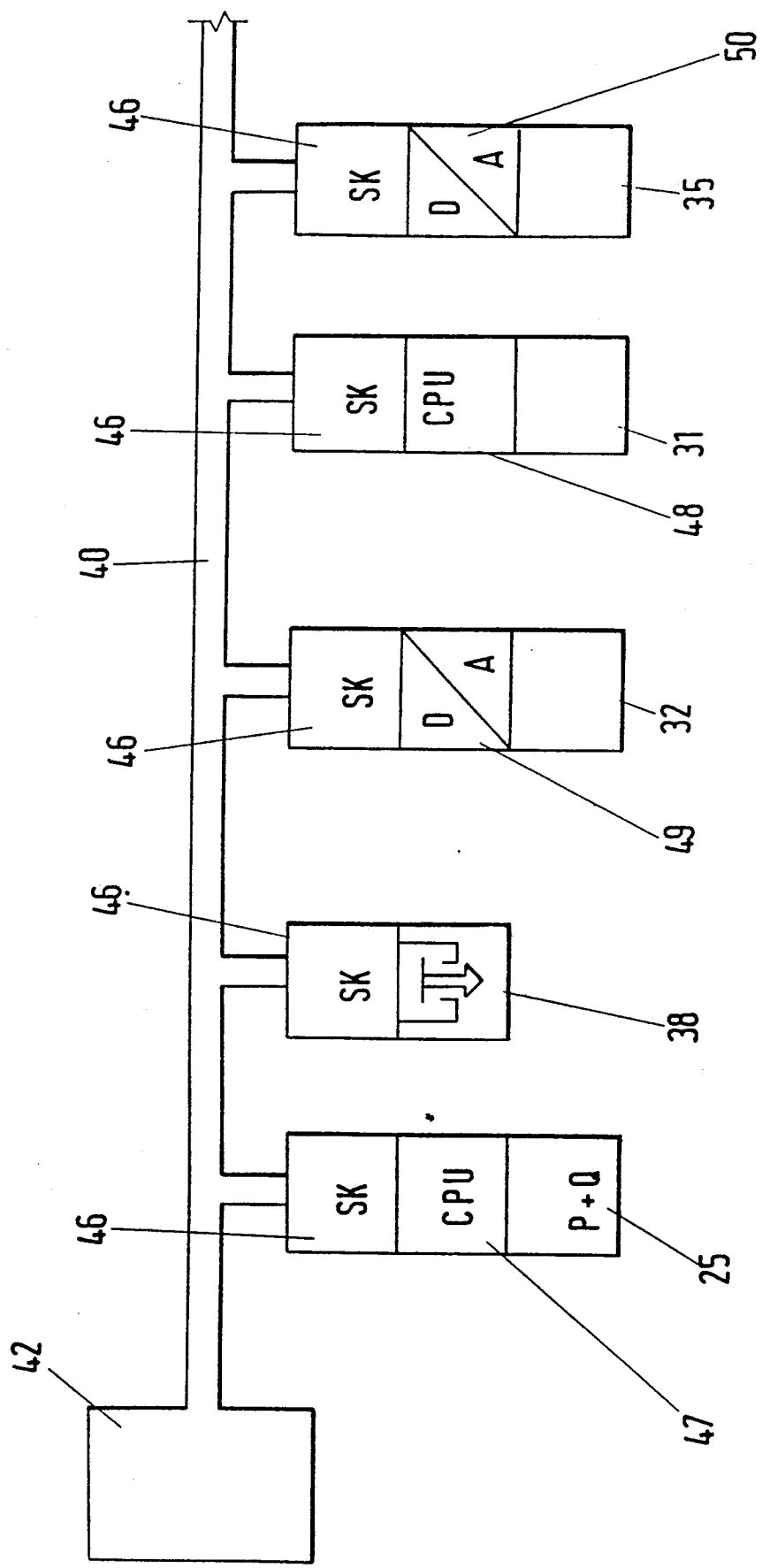
FIG. 2 is a diagramatic illustration of the direction and the control means, of FIG. 1 shown in detail.

FIG. 2 illustrates only a portion of the closed loop lead 40 with sensors 31, 32 and 35 and directional valve actuator 25, as well as other related electronic components arranged between the sensors and actuators and the closed loop lead (not otherwise shown in FIG. 1 for the sake of clarity).

Figure 4:
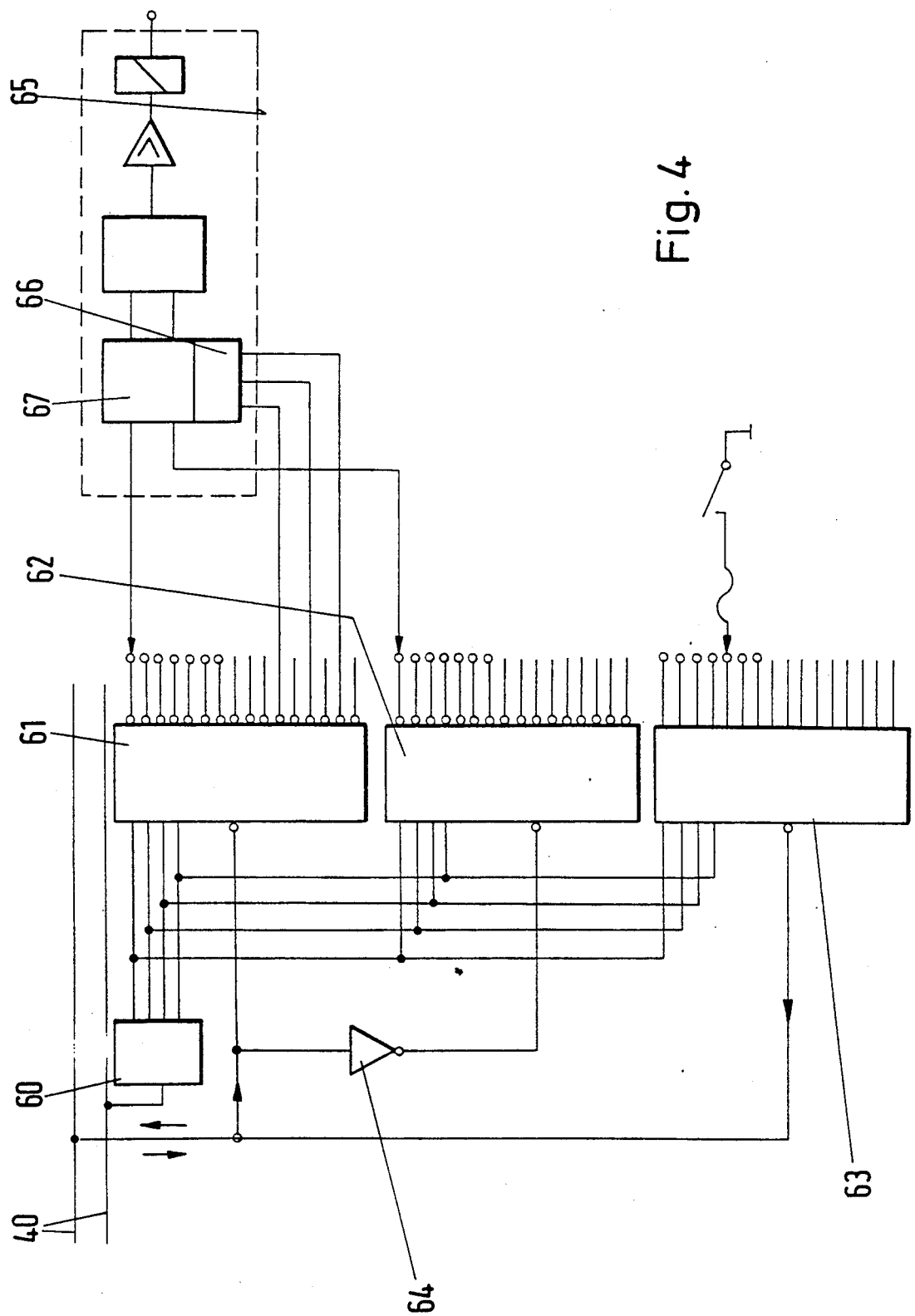
FIG. 4 is a diagram of an embodiment for an interface coupler.

An interface coupler 46 is arranged between the closed loop lead and each of the respective sensors and actuators, the couplers being of essentially the same structure but used differently, depending on their intended purpose. The structure of the interface coupler is described with reference to FIG. 4 illustrating one embodiment of such coupler.

A one-chip computer 47 is arranged between the interface coupler and valve actuator 25.

A particular directional (path) processor 48 or a digital/analog converter 49 or 50 is arranged between the interface couplers 46 and 31, 32 and 35, respectively. Controller 42 is also a clock and time generator and takes over the non-decentralized control commands, such as the type of operation (automatic, manual), the assignment of drive commands to the decentralized closed control circuits, and presets the steps of the course direction.

The operation will be first described based on the operation of the plastification-injection unit. After the Plastification process, the injection screw 17 reaches a predetermined position from which it is axially shifted in the direction of the closed injection mold and retracted to another predetermined position, whereafter an injection-molded part is simultaneously ejected.

It is assumed that the total forward stroke is divided into four segments, whereby during the first two segments a speed-dependent control (speeds V1 and V2) occurs in a closed manner and in the other two segments a pressure dependent control (hydraulic pressure p1 and p2 place, and whereby in the first three segments of the stroke plastification and injection screw is filled with plasticized material and during the third segment the shrinkage from the cooling injection molded part is compensated by the addition of further plasticized material.

All the sensors continuously supply their measured signals to the closed loop line and thus to all other participants (sensors, actuators).

Moreover, the clock generator 42 supplies signals to the closed loop lead and thus simultaneously a counting clock to all participants jointly, the counting phase consisting of pulse sequences of the same number of pulses and interspaced rests.

For further simplification, it is assumed that the closed loop line has, apart from a power supply line, a line for the counting clock and a line for data.

As the sensors continuously pass on signals to the closed loop line, the status of the control changes stepwise, pulse quantities arrive with varying numbers of pulses on the data line.

From the assignment of the pulses based on the synchronously repeating counting clock and the data on the data line result in the assignment of the data to the individual actuators.

Figure 3:
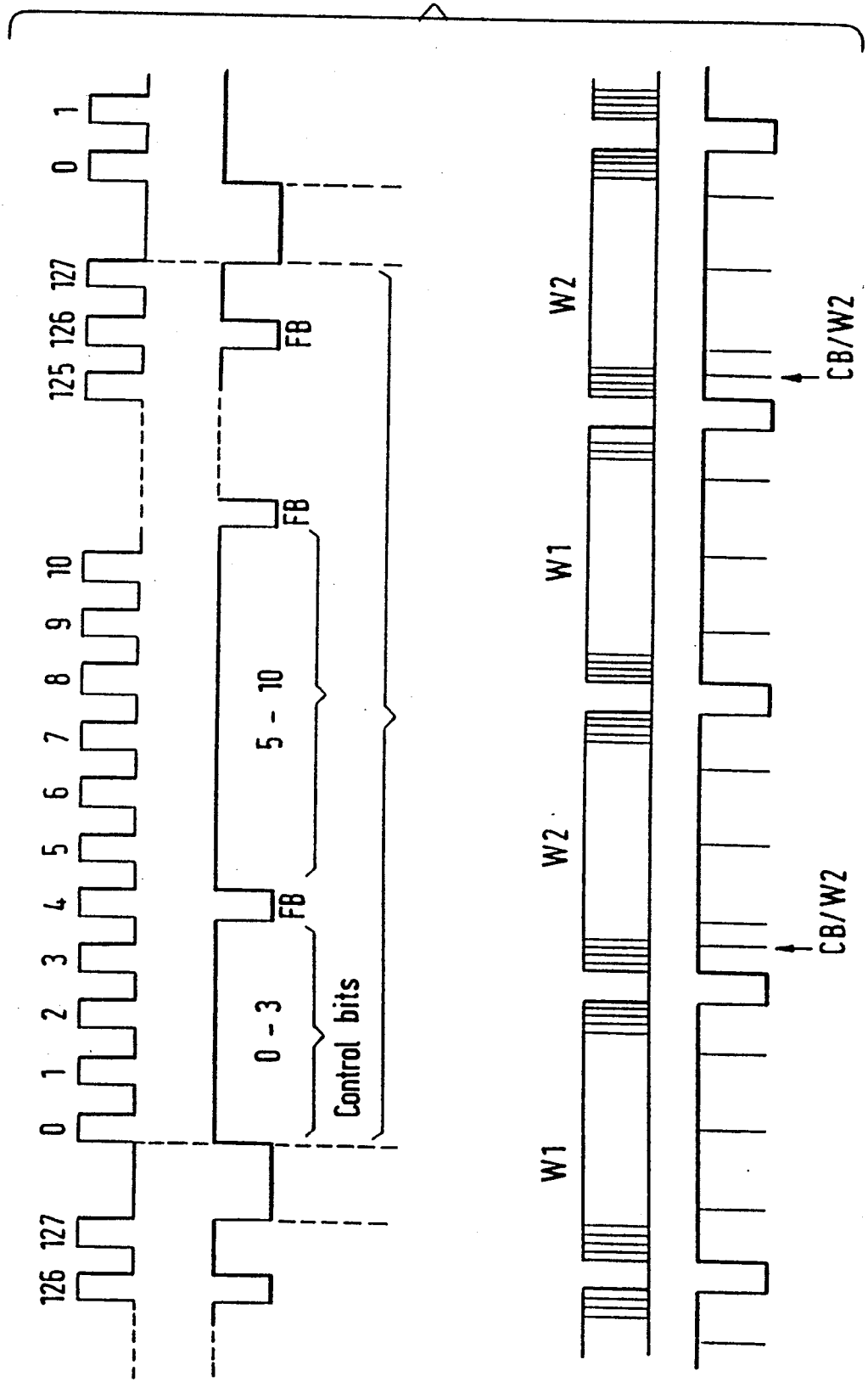
FIG. 3 is a diagram explaining the operation according to the invention.

Referring to FIG. 3, the counting clock consists of sequential repeating words, separated by intervals, shown as 128 pulses each.

The words of the data line are also separated by intervals which are of the same length as the intervals on the line for the counting clock.

The data on the data line is produced as follows. Between each two intervals there is first a given constant tension on the data line. The controller as well as the sensors and actuators can in each case switch this tension to the zero potential for the duration of one or several counting clock pulses, which has the effect of a clear assignment of the data pulses to the counting clock pulses. The maximum time phase frequency is limited by the problem of propagation delay.

Within a word on the data line firmly reserved pulses are provided as control bits, status bits and error detection bits. The remainder of the pulses of the respective word is assigned to the existing sensors and actuators.

Since a fixed assignment of the individual possible data bits relates to the counting clock as well as to the individual participants, each word can be reformed in the individual interface couplers by simply counting along and simultaneously comparing the data on the data line in each interface coupler. In the simplest case, the data register used for this purpose consists of a single binary memory cell.

The individual measures are known in data processing and thus are not further described.

While the injection screw 18 shifts toward the individual end points of the segments, the interface coupler passes continuously jointly existing data of the position and pressure sensors to the CPU unit 47. The required setting values for control valve 25 are processed through the component consisting of the interface coupler 46, the CPU unit 47 (one-chip computer) and the 4/3 directional valve actuator 25. This valve actuator is a one-or-two stage proportional valve with internal position feedback or a servovalve, which controls through the passage of hydraulic medium as well as the flow direction of the hydraulic medium and the pressure-corresponding to the algorithm determined by the program of the one-chip computer.

During this information processing, all other information of the complete word has to be taken into account in order to be able to execute a possibly required interruption based on an emergency situation.

Thus it is necessary to observe the bits for breakdown reports and the status indicator.

In the interface coupler the key bits for the purpose of error detection are checked in specifically reserved locations. It is of particular advantage that no prioritization is necessary in the processing of individual bits of the words and for the first time a rigid bus assignment mechanism is provided which thus operates in a synchronous manner within a given transmission time.

Without loss of time it is possible, for example, for the one-chip computer 47 to form signals through interface coupler 46 in order to operate another actuator.

This may comprise, for example, another valve actuator, switched as through a bypass, for increasing the flow-through in the hydraulic circuit of the hydraulic control. In such manner generally meshed control circuits for the hydraulic controls as well as the command values can be formed.

FIG. 4 illustrates an embodiment of an interface coupler, which consists of known components, and which are assembled together in the manner shown. For simplification the coupler is shown for a word length of 16 bits, as compared to the word length of 128 bits shown in FIG. 3.

The terminals of a counter 60 are switched onto the address entrances of two decoders 61 and 62 and a data selector 63.

Moreover, the terminals of counter 60 are led inverted through a negator 64 to another data entrance of decoder 62.

The terminals of decoder 61 are connected in a programmable manner to a starting control 65, shown in dashed outline, which includes a device 66 for error detection and a device 67 for locking after an error has been detected.

The installation for error detection serves for the detection of transmission errors.

Instead of single electronic components as shown in FIG. 4, it is possible to use an integrated control, for example, gate arrays, PLA's, etc., with the advantage of a programmable linkage.

Control bits (FIG. 3) serve, for example, for the expansion of capacity of the available data bits if, as shown in FIG. 3, the words W1 and W2 are formed alternately successively and thus doubling the total number of available data bits.

In addition, it is possible to rapidly form with the control bits special words for the automatic error diagnosis up to the automatic destruction and substitution of substitutable inputs/outputs of defective interface couplers.

Since all participants have joint access to all data from all participants, it is possible to make available to the controller or the terminal for display all current values at any time without overloading the transmission processes.

What is claimed is:

1. A method for directing and controlling the operation of an injection molding machine by means of at least one device governed by a timing program said machine having a number of sensors which provide actual values during machine operation and a number of actuators forming and executing control commands received from the sensors, comprising the steps of:
serially connecting the sensors and actuators in a predetermined relationship via a closed loop control cable for carrying data and timing information such that all information is available in successive words, jointly releasing information from the actuators and/or sensors on to the cable and, in dependence on the status of the program timing, jointly executing the control commands of the actuators.

2. The method according to claim 1, further comprising communicating the actuators with one another for the formation of the control commands.

3. The method according to claim 1, further comprising collecting at least part of the information with test information to formulate total information, testing the total information to determine if the test information is at prescribed positions, the total information being capable of being transmitted and processed.

4. A device for directing and controlling valve actuators of an injection molding machine by means of at least one device governed by a timing program, the injection molding machine having a number of sensors which provide actual values during machine operation, the machine having a number of actuators being capable of forming and executing control commands received from the sensors, comprising a closed loop control cable for carrying data and timing information, said cable serially interconnecting the sensors and actuators in a preassigned relationship so that all information is available in successive words, means for releasing information of the actuators and/or sensors jointly and in dependence on the status of the program timing, the actuators jointly executing their control orders in accordance with the released information.

5. The device according to claim 4, wherein the sensors and actuators are coupled to the cable through interface couplers.

6. The device according to claim 5, wherein CPU units are operatively connected between the interface couplers and at least several of said actuators.

7. The device according to claim 6, wherein the interface couplers comprise transmitters and/or receivers.

8. Apparatus for directing and controlling an injection molding machine having sensors responsive to machine parameters for providing signals indicative thereof during machine operation, a plurality of actuators for operating various machine functions and processing means for controlling selected individual actuators comprising:

timing means governed by a program for synchronously controlling the sensors and the actuators;

close loop control cable channel means for carrying data and timing information among the actuators, the sensors and the timing means;

interface means serially connecting the sensors and actuators on the cable in a predetermined relationship, so that all information provided by the actuators and the sensors is available in successive words in accordance with the predetermined relationship; and means for coupling the information simultaneously on to the cable in accordance with the program, said actuators being selectively operative in accordance with the released information.

* * * * *